United States Patent [19]
Snapp

[11] Patent Number: 5,875,398
[45] Date of Patent: Feb. 23, 1999

[54] METHOD AND APPARATUS FOR TESTING CELLULAR SERVICES IN A FIRST LOCATION FROM A SECOND LOCATION REMOTE FROM THE FIRST LOCATION

[75] Inventor: John Lawrence Snapp, Redmond, Wash.

[73] Assignee: AT&T Wireless, Kirkland, Wash.

[21] Appl. No.: 734,707

[22] Filed: Oct. 21, 1996

[51] Int. Cl.[6] .............................. H04B 17/00; H04Q 7/34; H04M 1/24

[52] U.S. Cl. ........................ 455/424; 455/67.4; 375/224; 379/29; 379/34

[58] Field of Search ..................................... 455/423, 424, 455/425, 67.4; 379/5, 27, 29, 34; 370/249, 250; 375/224, 227, 358

[56] References Cited

U.S. PATENT DOCUMENTS

| 5,481,588 | 1/1996 | Rickli et al. | 455/423 |
| 5,615,225 | 3/1997 | Foster et al. | 379/29 |
| 5,636,202 | 6/1997 | Garney | 379/29 |
| 5,768,688 | 6/1998 | Owada | 455/424 |

*Primary Examiner*—Willis R. Wolfe

[57] ABSTRACT

A remote automated cellular test set can be disposed in a first location and accessed via a communication network from a second location that is remote from the first location. The access to the test set can be by a technician's terminal which can remotely initiate the execution of certain commands by a first cellular phone (a test phone) in the first location. A second cellular phone is connected to the first cellular phone by an audio looping technique that permits a technician at a remote location to use the test phone at the first location as if that technician were physically located at the first location.

17 Claims, 3 Drawing Sheets

METHOD AND APPARATUS FOR TESTING CELLULAR SERVICES IN A FIRST LOCATION FROM A SECOND LOCATION REMOTE FROM THE FIRST LOCATION

BACKGROUND OF THE INVENTION

The present invention is directed to an apparatus for testing cellular service in one location from a remote location and a method for operating such an apparatus. More specifically, the present invention provides a remote cellular automated test set including at least two cellular phones where the test set is remotely controllable.

Use of cellular communication techniques continues to grow. More and more users subscribe to services provided by various cellular service providers. Typically the service providers provide services over wide geographic areas. As a consequence, it is difficult for the provider to have the technical resources for trouble-shooting service problems in each of these geographically disparate areas. In the past, when a service provider has received a complaint about service in a geographic area remote from where technical support capabilities are present, the service provider has had to send a technician and equipment to the remote geographic location and perform tests to attempt to discern the source of the service problem. For example, where the service provider has its technical support located in Salt Lake City, Utah with no technical support in Boise, Id. where service is provided, and one or more subscribers report service problems arising in Boise, it was necessary to send a technician with the appropriate equipment to Boise to diagnose the system problems. This creates logistical problems for the deployment of technical resources. It prevents the achievement of efficiencies and cost savings which could be realized by centralizing or consolidating technical resources. It is therefore desirable to have the ability to perform necessary testing from a remote location without need of sending personnel to disparate geographic areas.

SUMMARY OF THE INVENTION

The present invention provides for remote automated testing of cellular services. More specifically, the present invention provides a test set that can be installed in a particular geographic region and easily accessed when remote testing is warranted. The test set includes at least two cellular phones, an access cellular phone and a test cellular phone. The test set has a communication interface so as to be accessible by a remotely located technician terminal. Communications between the technician terminal and the test set occur via a communication network. To provide the remotely located technician with a voice path that effectively monitors the cellular service within the remote geographic region, the access cellular phone provides an end point to a voice path from a telephone located at the remote location. Audio looping between the access cell phone and the test cell phone permits the technician sitting at the remote telephone to receive the same signals received by the test cell phone and to generate those signals which are to be transmitted by the test cell phone.

This test set further includes a digital interface board which permits the technician at the remote technician terminal to perform certain commands on the cell phones in the test set. Such commands include programming the cell phones, dialing out on the cell phones, and power up or power down the cell phones. As a consequence, the service provider has a relatively inexpensive way of remotely testing cellular services in disparate geographic regions.

DETAILED DESCRIPTION

Figure 1:
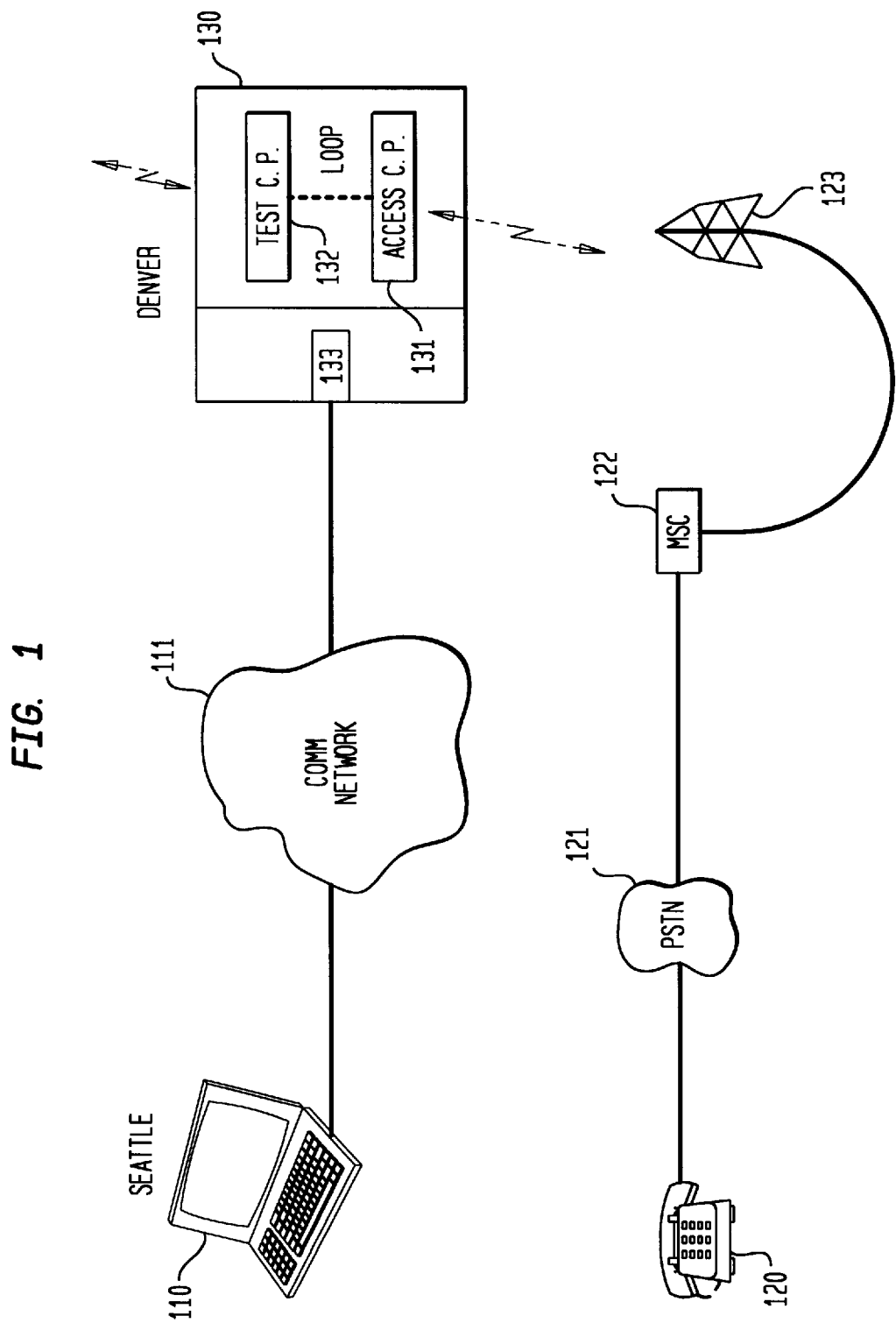
FIG. 1 is a schematic diagram of a remote cellular automated test configuration in accordance with an embodiment of the present invention.

For purposes of describing the present invention it is presumed that the cellular provider in question has certain technical resources centralized in Seattle, Wash. yet wishes to monitor certain cellular services in Denver, Colo. This situation could arise where a service subscriber roaming in Denver has experienced certain access problems or other deficiencies in cellular service. The service provider is then interested in testing the cellular services within the region in which the error occurred. It may even be desirable to essentially replicate the cell phone which experienced the problems.

In an embodiment of the present invention, a remote cellular automated test set 130 is disposed in the geographic region of interest. It is presumed that such a test set would have been earlier distributed into the geographic regions which are likely to be of interest to the service provider. The test set includes a test cellular phone 132 and an access cellular phone 131 which are looped together. In addition, the test set includes a data interface 133. Further details about the test set are described in connection with FIGS. 2 and 3.

A technician in Seattle can begin a test session at a technician terminal 110. The terminal can initiate communications with the test set via a communication network 111. At the same time, it is desirable to establish a voice path into the same geographic region. Thus, the technical personnel in Seattle, using telephone 120 can create a voice path to the test set. First, the telephone 120 is connected to the Public Switch Telephone Network (PSTN) 121 that provides a path to a Mobile Switching Center (MSC) 122 located in the region of interest. The MSC provides a path to a local cell site 123. An over-the-air connection is then provided to the access cell phone 131. The technician at the technician's terminal 110 can send commands to the test set to be executed by a process described in detail below. The processor can cause the test cell phone 132 to initiate a call. Typically the call will be handled by the same cell site equipment that originates the voice path to the access cell phone 131. An audio looping capability which is later described in further detail couples the access cell phone 131 and the test cell phone 132 so that the technician at telephone 120 can hear the same audio information that is received by the test cell phone 132 and that same technician can generate the voice information which is to be transmitted by that test cell phone 132 at the remote telephone 120. In addition, the operation of the technician's terminal 110 can command the operation of the keyboard of either test cell phone 132 or access cell phone 131 thereby further enhancing the appearance that the technician is present in Denver despite being physically located in Seattle.

Figure 2:
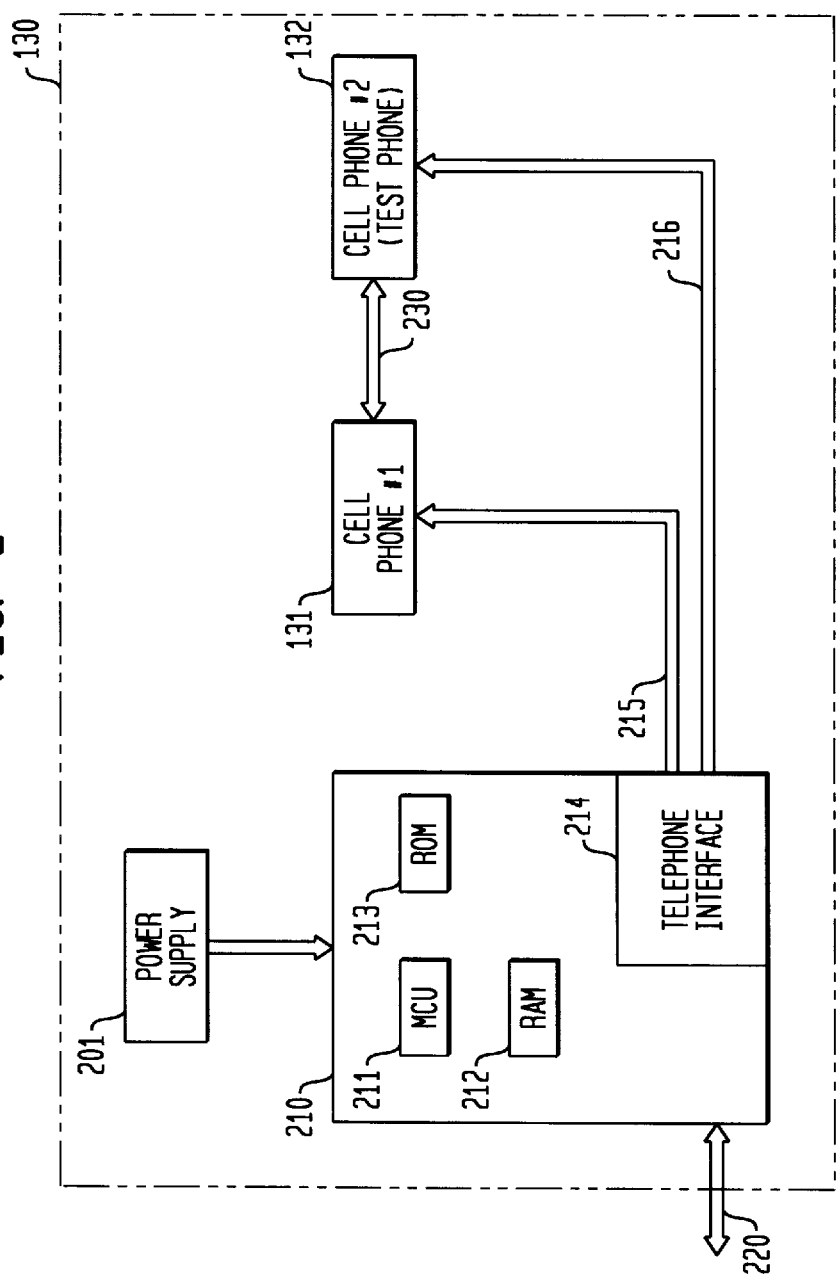
FIG. 2 provides a more detailed block diagram illustration of the remotely located test set of FIG. 1.

FIG. 2 provides a more detailed block diagram of the remote automated cellular test set of FIG. 1. Access cell phone 131 and test cell phone 132 are shown in the figure. These cell phones are coupled together via a loop access 230. A digital interface board 210 provides the intelligence for the test set and the capability to respond to commands provided by the technician terminal that is remotely located. The digital interface board includes a microcontroller unit 211 which performs the processing functions for the digital interface board. A Read Only Memory (ROM) 213 stores control programs to be executed by the MCU 211 as it carries out commands received from the technician terminal. A Random Access Memory (RAM) 212 stores temporary information either transmitted to the test set from the remote location or information detected at the remote location by the MCU in conjunction with a telephone interface 214 that is coupled to the two cell phones via connectors 215 and 216. The digital interface board 210 includes an RS-232 interface 220 which permits the board to receive data from the technician terminal. This data includes commands generated at that terminal for controlling the operation of either one or both of the cell phones in the test set.

Figure 3:
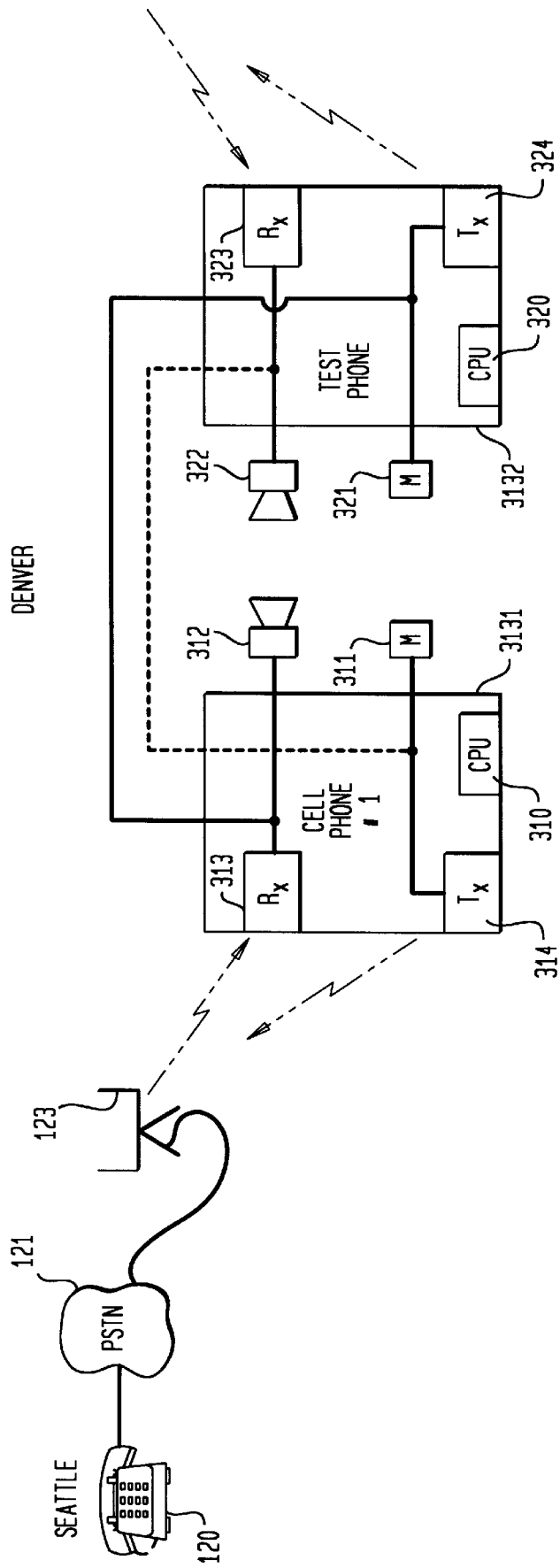
FIG. 3 provides a schematic illustration of an audio looping aspect of the embodiment of the test set illustrated in FIG. 2.

FIG. 3 shows in somewhat greater detail the effective connections achieved by the audio looping coupling 230. The access cell phone, 3131 has a receiver Rx (313) that receives wireless transmissions from cell site 123. That same cell phone has a transmitter Tx (314) which transmits to the cell site 123. The receiver 313 is coupled to a speaker 312 whereby a user of the cell phone at the phone's location would be able to listen to information received by receiver 313. The transmitter 314 is connected to microphone 311 which is capable of receiving voice from a user and providing that as transmit information to the transmitter 314. The cell phone 3131 includes a CPU 310 which controls the operations of the cell phone. The CPU is coupled via the telephone interface to the digital interface board in the test set (this connection is not shown in FIG. 3). The test phone 3132 has similar functional elements. A transmitter Tx (324) is connected to microphone 321 and transmits voice information received at that microphone. Receiver Rx (323) receives information from the local cell site and provides it to speaker 322. The test phone 3132 also has its own CPU 320 coupled to the digital interface board of FIG. 2 via the telephone interface 214 (the connection not being shown in FIG. 3). The audio looping relates to the cross connection of receivers and transmitters of the two cellular phones. More specifically, the output of the receiver 313 is coupled to the input of the transmitter 324. Thus, the technician at the remote location using telephone 120 can provide voice information via the PSTN to the cell site 123, where that voice information is received by receiver 313 of cell phone 3131 and is passed onto the transmitter 324 of test phone 3132 for transmission to the local cellular system. The output of the receiver 323 of cell phone 3132 is provided to the input of the transmitter 314 of cell phone 3131. As a consequence, the voice information received from the cellular system by receiver 323 is passed to the transmitter 314 in the access cell phone 3131 and transmitted to the remote technician along the voice path established to telephone 120. As a result of these connections between the two cellular phones and the establishing of a voice path to the technician at the remote location, it is as if the technician were physically present with and capable of operating the test cell phone 3132. The technician hears the same audio that is supplied to the speaker of test phone 3132. Furthermore, the voice supplied by the technician in Seattle is transmitted by the transmitter 324 just as if it had been entered directly into microphone 321. Therefore, from the voice perspective it is as if the technician is in Denver on test phone 3132.

The communication path by which the technician terminal accesses the test set and can control the operation of either cellular phone or both cellular phones allows the technician at the remote location to simulate a hands-on operation of the test phone 3132.

In an additional feature of the present invention the communication connection between the test set and the technician terminal permits the transfer of display information which is provided to the cellular telephone(s) to the technician terminal for display at that terminal. In particular, to the extent that test cell phone 3132 receives information via receiver 323 to be displayed on that phone, CPU 320 can provide this display information via the telephone interface 214 to the digital interface board 210. The interface board can then transfer the display data via RS-232 interface 220 to the technician terminal 110 at the remote location. As a consequence of these connections, the remote location "sees" from the perspective of the target or test cell phone in the region of interest. This provides the remote location with the capability of checking user functionality, that is replicating a customer activity within the region of interest and determining whether that activity is successful. Such activities might include the customer's ability to roam so as to place calls or to receive calls. It also may test the subscriber's ability to access intelligent network services from the region of interest.

The connection from the technician terminal 110 to the test set 130 can be accomplished via the PSTN with a modem or alternatively it could be accomplished via the cellular network with a modem rather than by using the communication network 111.

Furthermore, in an embodiment of the present invention the system employs two cellular phones manufactured either by Ericsonn or Nokia or Oki. These phones each have a serial interface that permits access to their CPU as well as access to that phone's audio circuitry. These capabilities of the serial telephone interface permit the audio looping set forth in the present invention as well as the access to the CPU of the phones that permits the execution of commands on the phones via digital interface board.

The commands that the technician's terminal can execute remotely include:
1. Programming either of the phones with a phone number;
2. Dialing a phone number with either phone;
3. Over dialing on either phone;
4. Show status of phone(s);
5. Administrative commands such as "change password", "change profile", etc.);
6. Log out;
7. Power cycle phone(s);
8. End phone A;
9. End phone B. This merely is a list of examples and should not be considered an exhaustive list of remote controllability.

In view of the flexibility and programmability of the test sets of the present invention, a cellular service provider can more centralize its technical resources and still provide sufficient testing of cellular services in geographically disparate regions.

What is claimed is:
1. A method for testing services in a first location from a second location remote from the first location comprising the steps of:
   establishing a first voice path between a first cellular telephone in said first location and said second location;
   establishing a second voice path, said second voice path being between a second cellular telephone in said first location and third location;

bridging said first voice path and said second voice path wherein said second location is coupled to and can communicate through said second cellular telephone.

2. The method of claim 1 wherein said first and second cellular telephones are coupled to an input/output interface and comprising the further step of controlling said first and second cellular phones via commands transmitted from said second location to said input/output interface.

3. The method of claim 2 wherein said step of controlling includes the substeps of programming said first cellular phone with a first test number and programing said second cellular phone with a second test number.

4. The method of claim 2 comprising the further steps of transmitting display information via said input/output interface to said second location, said display information corresponding to information displayed on one of said first and second cellular telephones.

5. The method of claim 1 wherein said step of bridging comprises the substeps of:

coupling a transmitter of said first cellular phone to a receiver of said second cellular phone; and coupling a receiver of said first cellular phone to a transmitter of said second cellular phone.

6. An automated test set for testing wireless services in a first location from a second location remote from said first location, the test set comprising:

a first cellular telephone;

a second cellular telephone;

a digital interface board coupled to said first cellular telephone and said second cellular telephone;

an audio switch coupling said first cellular telephone and said second cellular telephone; and an input/output interface coupled to said digital interface.

7. The test set of claim 6 wherein said first cellular telephone establishes a first voice path with said second location and said audio switch bridges said first voice path with a second voice path established by said second cellular telephone.

8. The test set of claim 6 wherein said digital interface board comprises a processor that controls said first and second cellular telephones in accordance with commands received from said second location by said input/output interface.

9. The test set of claim 7 wherein said digital interface board comprises a processor that controls said first and second cellular telephones in accordance with commands received from said second location by said input/output interface.

10. In a test set for monitoring cellular services in a first location, the improvement comprising:

a first cellular telephone useful for establishing a first voice path to a second location remote from said first location;

a second cellular telephone useful for establishing a second voice path; and an audio switch that couples said first cellular telephone to said second cellular telephone.

11. The improvement of claim 10 wherein said audio switch includes:

a first connection path that couples a transmitter of said first cellular telephone to a receiver of a second cellular telephone; and a second connection path that couples a receiver of said first telephone with a transmitter of said second telephone.

12. A method of simulating on-site operation of a first cellular phone at a first location from a second location remote from said first location comprising the steps of:

establishing a first voice path between the second location and a second cellular telephone at said first location;

establishing a second voice path with said first cellular telephone;

bridging said first and second voice paths.

13. The method of claim 12 further comprising the steps of:

generating a command at said second location;

transmitting said command to said first location;

operating said first cellular telephone in accordance with said command.

14. The method of claim 12 wherein said step of bridging comprises:

coupling a transmitter of said first cellular telephone to a receiver of said second cellular telephone; and coupling a receiver of said first cellular telephone to a transmitter of said second cellular telephone.

15. A system for testing cellular service in a first location from said a second location remote from the first location, said system comprising:

a control terminal at said second location, said control terminal including a display;

a first cellular telephone at said first location;

a second cellular telephone at said first location;

an input/output interface receiving commands from said control terminal; and an audio switch at said first location coupled to said first cellular telephone and said second cellular telephone and responsive to received commands to bridge voice paths established by said first and second cellular telephones.

16. The system of claim 15 further comprising:

a digital interface board at said first location and coupled to said input/output interface and to said first and second cellular telephone;

wherein said digital interface board receives display data information from said second cellular telephone and provides said display data information to said control terminal via said input/output interface.

17. The system of claim 15 wherein said first cellular telephone establishes a first voice path to said second location.

* * * * *